(12) United States Patent
Huang et al.

(10) Patent No.: US 8,482,913 B2
(45) Date of Patent: Jul. 9, 2013

(54) PANEL DOOR AND PANEL WITH THE SAME

(75) Inventors: Ri-Dong Huang, Shenzhen (CN); Hsuan-Tsung Chen, New Taipei (TW); Guang-Yao Lee, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 201 days.

(21) Appl. No.: 13/207,434

(22) Filed: Aug. 11, 2011

(65) Prior Publication Data

US 2012/0275093 A1    Nov. 1, 2012

(30) Foreign Application Priority Data

Apr. 29, 2011   (CN) .......................... 2011 1 0110491

(51) Int. Cl.
*G06F 1/16*    (2006.01)

(52) U.S. Cl.
USPC .......... 361/679.33; 16/389; 312/221; 174/50; 435/91.2

(58) Field of Classification Search
USPC .... 16/324, 65, 49, 72, 273, 389, 82; 312/323, 312/220, 221, 321, 319.2, 111, 108, 138.1, 312/334.4, 319.1, 222; 361/679.01, 679.56, 361/679.59, 679.43, 679.46, 679.32, 695; 219/413; 174/50; 62/377; 435/6.11, 6.15, 435/91.2
See application file for complete search history.

(56) References Cited

U.S. PATENT DOCUMENTS 7,361,864 B2 *   4/2008   Lee et al. ...................... 219/413
2012/0211377 A1 *   8/2012   Sajid ............................. 206/216

* cited by examiner

*Primary Examiner* — Hung Duong
(74) *Attorney, Agent, or Firm* — Altis Law Group, Inc.

(57) ABSTRACT

A panel includes a front panel, a door, and a linking-up member. An opening is defined on the front panel to access an optical drive. The door is for covering and uncovering the opening. The linking-up member is slidably received in a first passage of the front panel and pivotally engaged with the door. A first resilient member is restricted between a rear side of the front plate and the linking-up member, wherein the first resilient member pulls the linking-up member inward. A second resilient member is positioned between the door and the linking-up member to pull the door inward to cover the opening. The door is pushed outward to uncover the opening when a tray of the optical drive is ejected.

12 Claims, 7 Drawing Sheets

PANEL DOOR AND PANEL WITH THE SAME

BACKGROUND

1. Technical Field

The present disclosure relates to a door, and particularly, to a panel door.

2. Description of Related Art

Optical drives are commonly installed in computers to read disc data, therefore, an opening on the front panel of the computer is used to access the optical device. For dust-proofing and aesthetic purposes, the opening is covered by a door and uses a spring to open and close the door pivotally. However, the door in operation may rub against the front panel, and leads to an unsmooth rotation which may scratch or damage the door.

Therefore, what is needed is a panel door that overcomes the problem.

BRIEF DESCRIPTION OF THE DRAWINGS

The components in the drawings are not necessarily drawn to scale, the emphasis instead being placed upon clearly illustrating the principles of a panel door. Moreover, in the drawings, like reference numerals designate corresponding parts throughout the several views.

DETAILED DESCRIPTION

Figure 1:
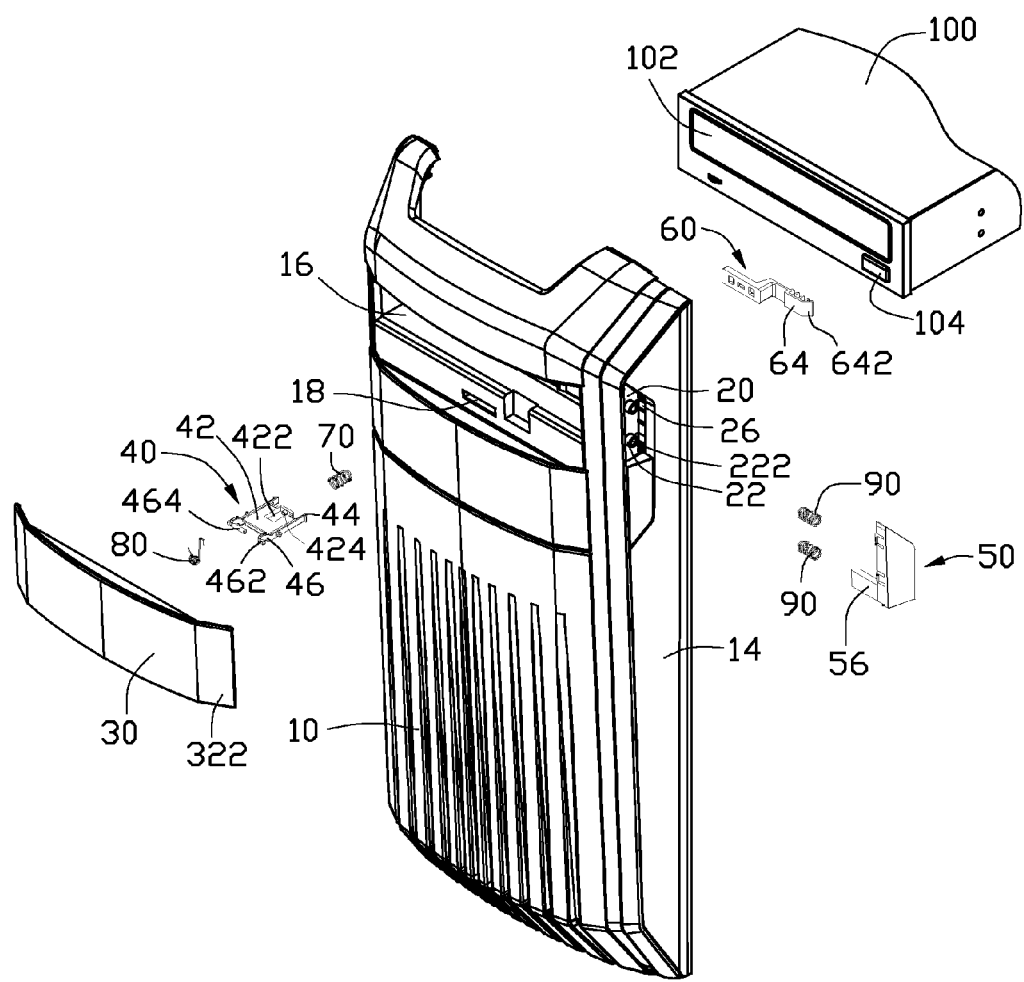
FIG. 1 is an isometric, exploded view of a panel, together with an optical drive, in accordance with an exemplary embodiment.
Figure 2:
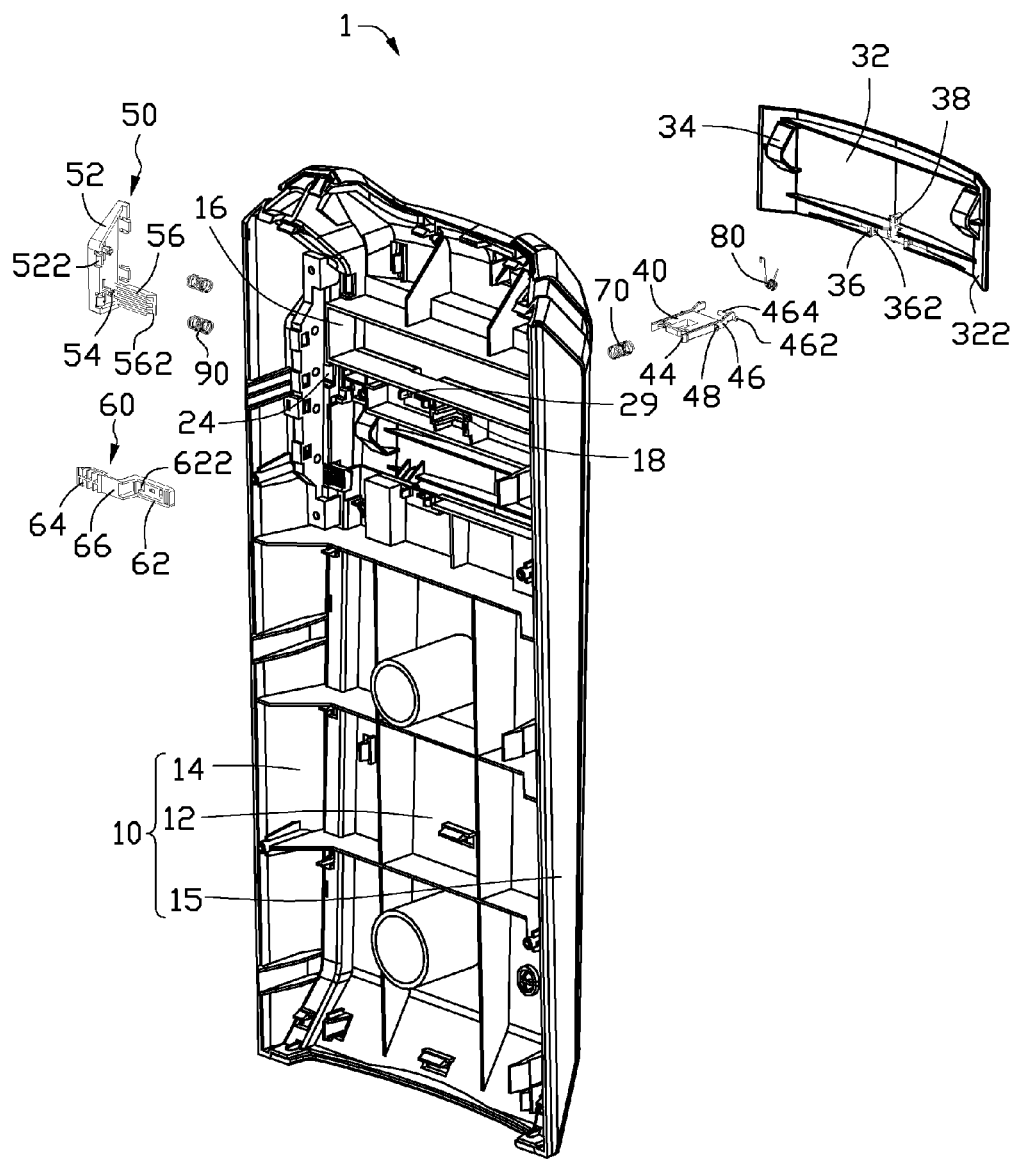
FIG. 2 is an isometric, exploded view of another aspect of the panel of FIG. 1.

Referring to FIG. 1-2, the panel 1 includes a front panel 10, a curve-shaped door 30, a linking-up member 40, a button 50, a pushing member 60, and three resilient members 70, 80, and 90.

Figure 7:
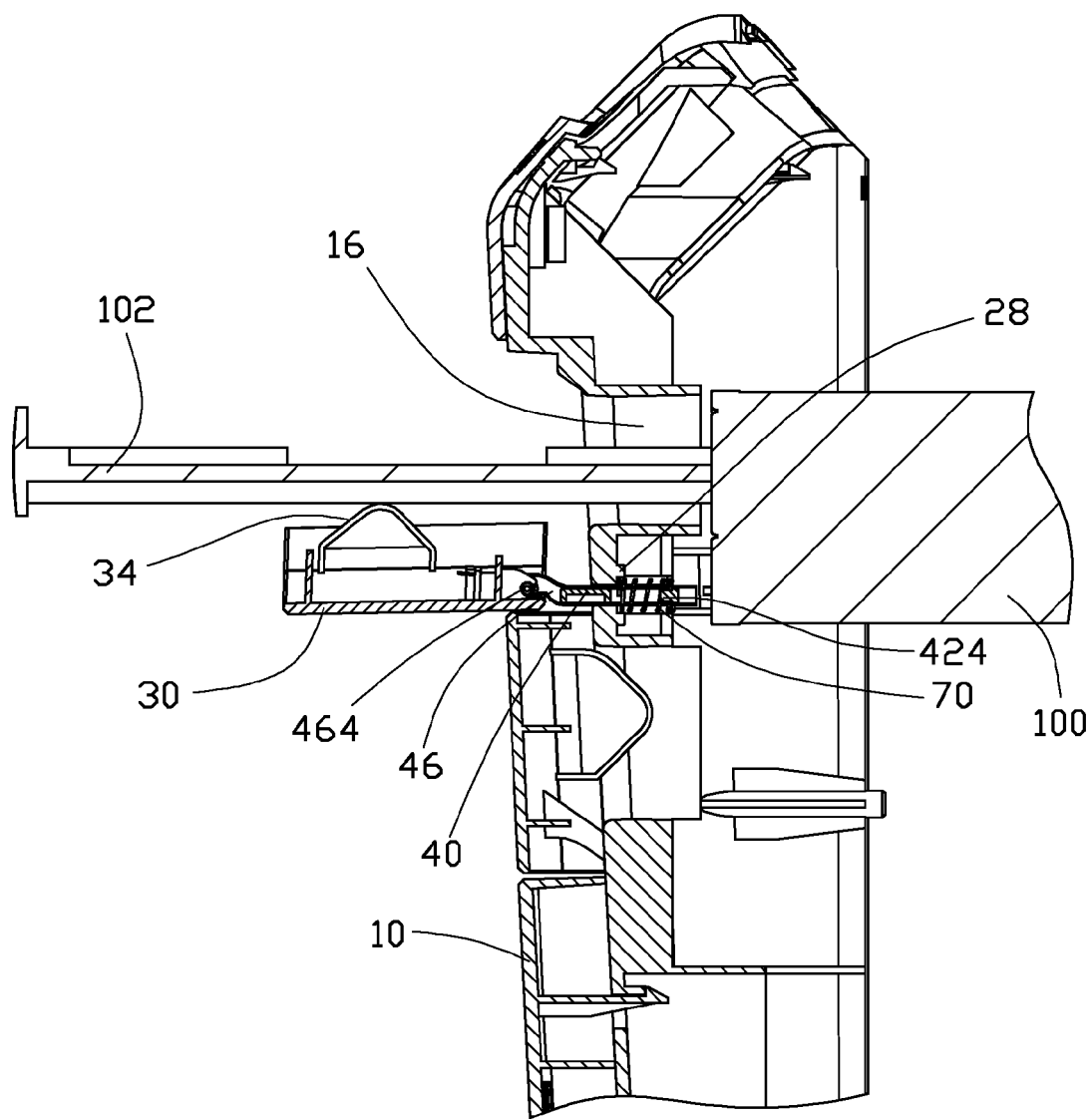
FIG. 7 is a cross section view of FIG. 6, taken along line VII-VII line thereof.

The front panel 10 includes a base plate 12, and a first side plate 14 and a second side plate 15 extending from two sides of the base plate 12. An opening 16, covered by the door 30, is defined on the front panel 10 to allow a tray 102 of an optical drive 100 to pass through, in and out. A first passage 18 corresponding to the linking-up member 40 is defined under the opening 16 of the base plate 12. A recess 20 is defined on the first side plate 14 to receive the button 50, and two columns 22, a second passage 24, and securing trough 26 is defined in the recess 20; both columns 22 define a column hole 222. Two bumps 28 (shown in FIG. 7) are arranged on the rear side of the base plate 12 on the edge of the first passage 18. Two securing hooks 29 are arranged on the rear side of the base plate 12 to secure the pushing member 60. In the present embodiment, the optical drive 100 is a CD-ROM drive.

The door 30 includes a cover plate 32 and two bow-shaped members 34, two pivot sections 36, and two spring hooks 38 are arranged on the cover plate 32. A pivot hole 362 is defined in each pivot section 36. Two side pieces 322 extend from two sides of the base plate 12, respectively.

The linking-up member 40 includes a linking-up plate 42 movably received in the first passage 18 of the base plate 12. Two retaining arms 44 and two suspension arms 46 extends in opposite directions from the linking-up plate 42. A trough 422 is defined in the linking-up plate 42 to receive the first resilient member 70, and a retaining pin 424 is arranged in the trough 422 to retain the first resilient member 70. Two retaining protrusions 48 are arranged on two sides of the linking-up plate 42. A pivot pin 462 is arranged on each suspension arm 46 and is pivotally engaged with the pivot hole 362 of the door 30. A spring holder 464 is arranged on one of the suspension arms 46.

The button 50 includes a button plate 52, two pillars 54, and a pushing arm 56 extending from the button plate 52. Multiple securing members 522 are arranged on one side of the button plate 52, corresponding with the securing troughs 26 of the recess 20. A pushing surface 562 is defined on the pushing arm 56.

The pushing member 60 includes a fixation section 62, an actuating section 64, and an L-shaped elastic linking section 66 between the fixation section 62 and the actuating section 64. Two securing slot 622 are arranged on the fixation section 62 in correspondence with the securing hook 29 of the base plate 12. An actuating surface 642 is defined on the actuating section 64 corresponding to the pushing surface 562 of the pushing arm 56.

Figure 3:
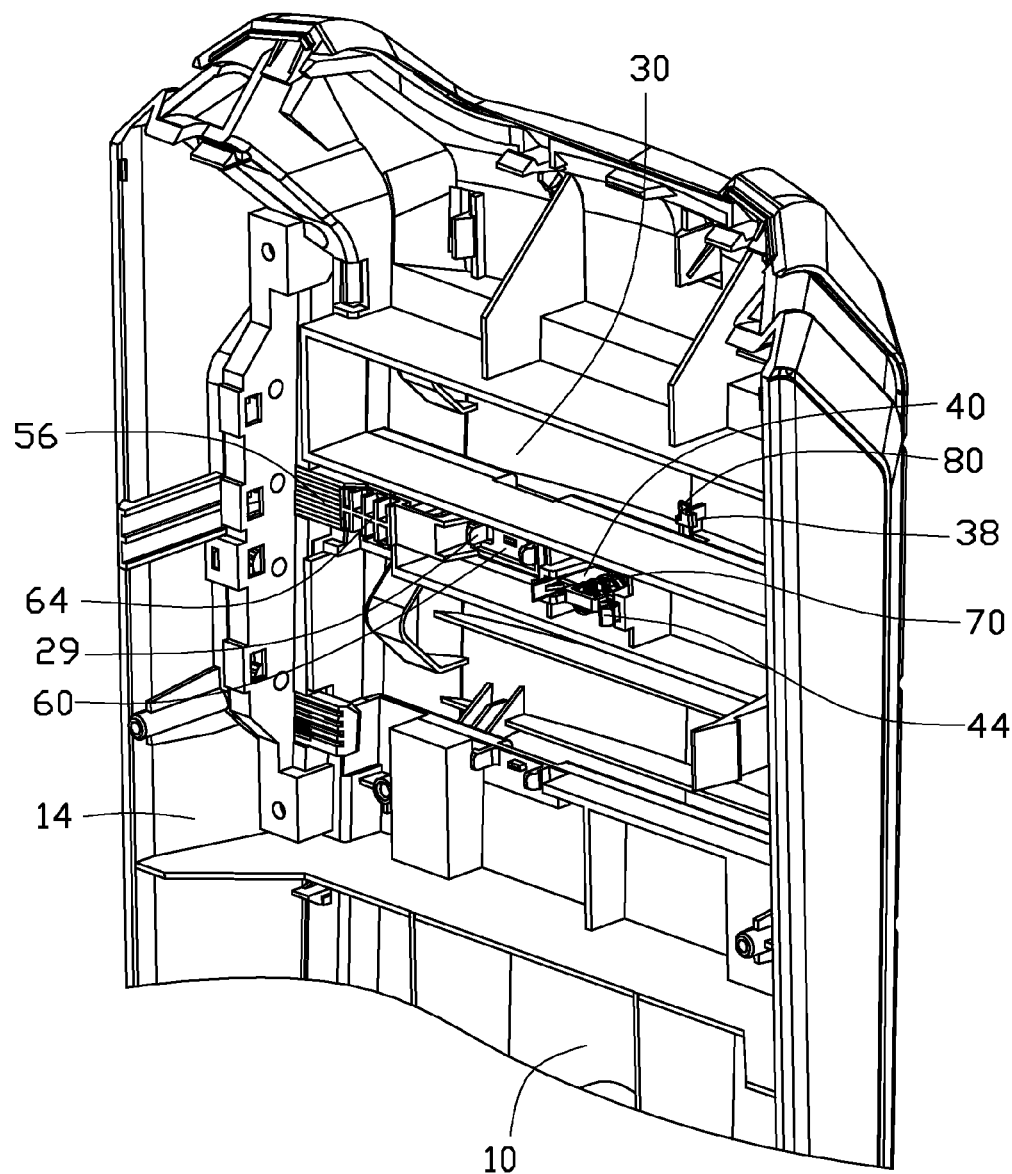
FIG. 3 is an enlarged, partial view of the panel of FIG. 2.
Figure 4:
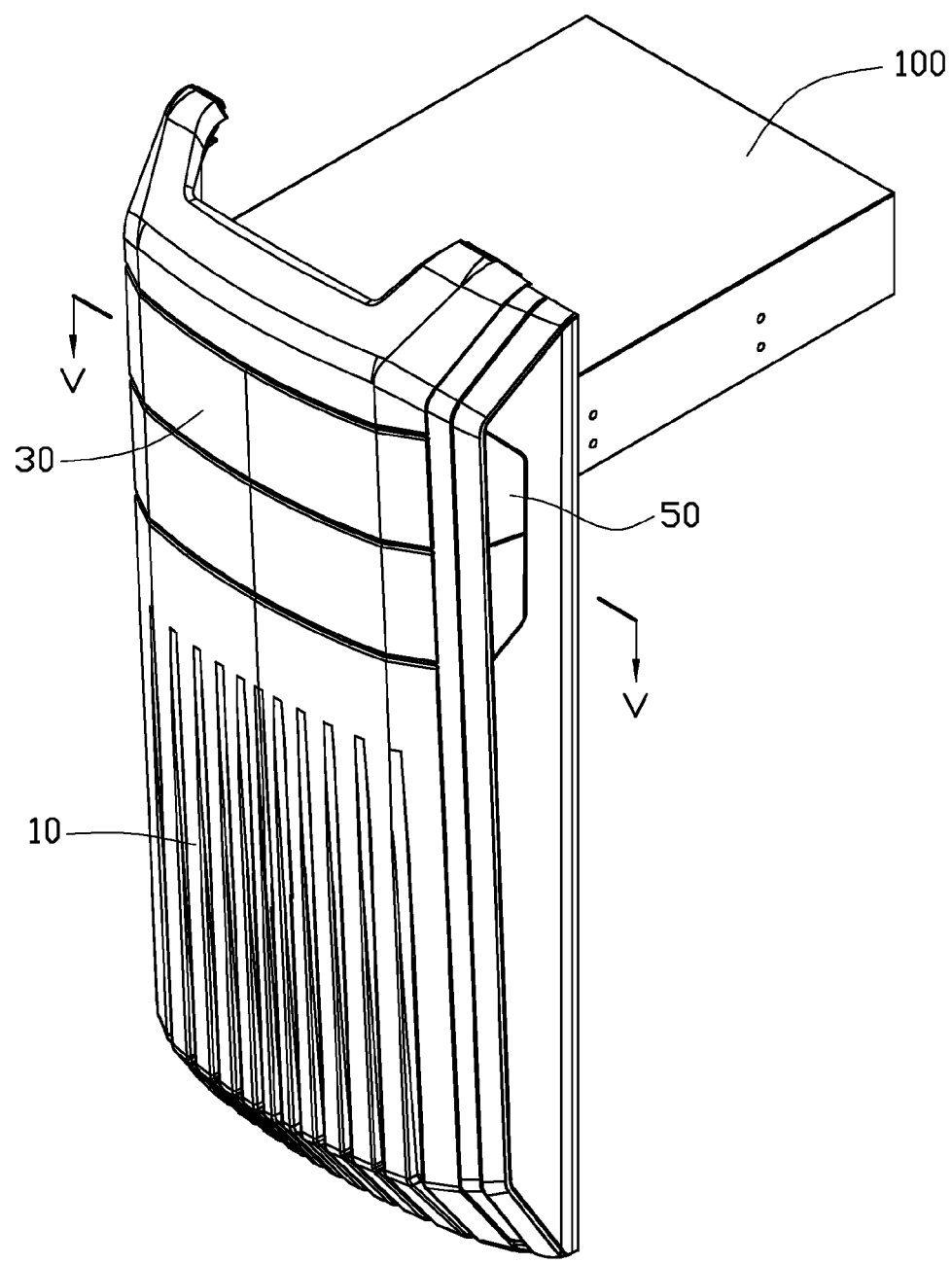
FIG. 4 is an isometric, assembled view of the panel and the optical drive of FIG. 1.
Figure 5:
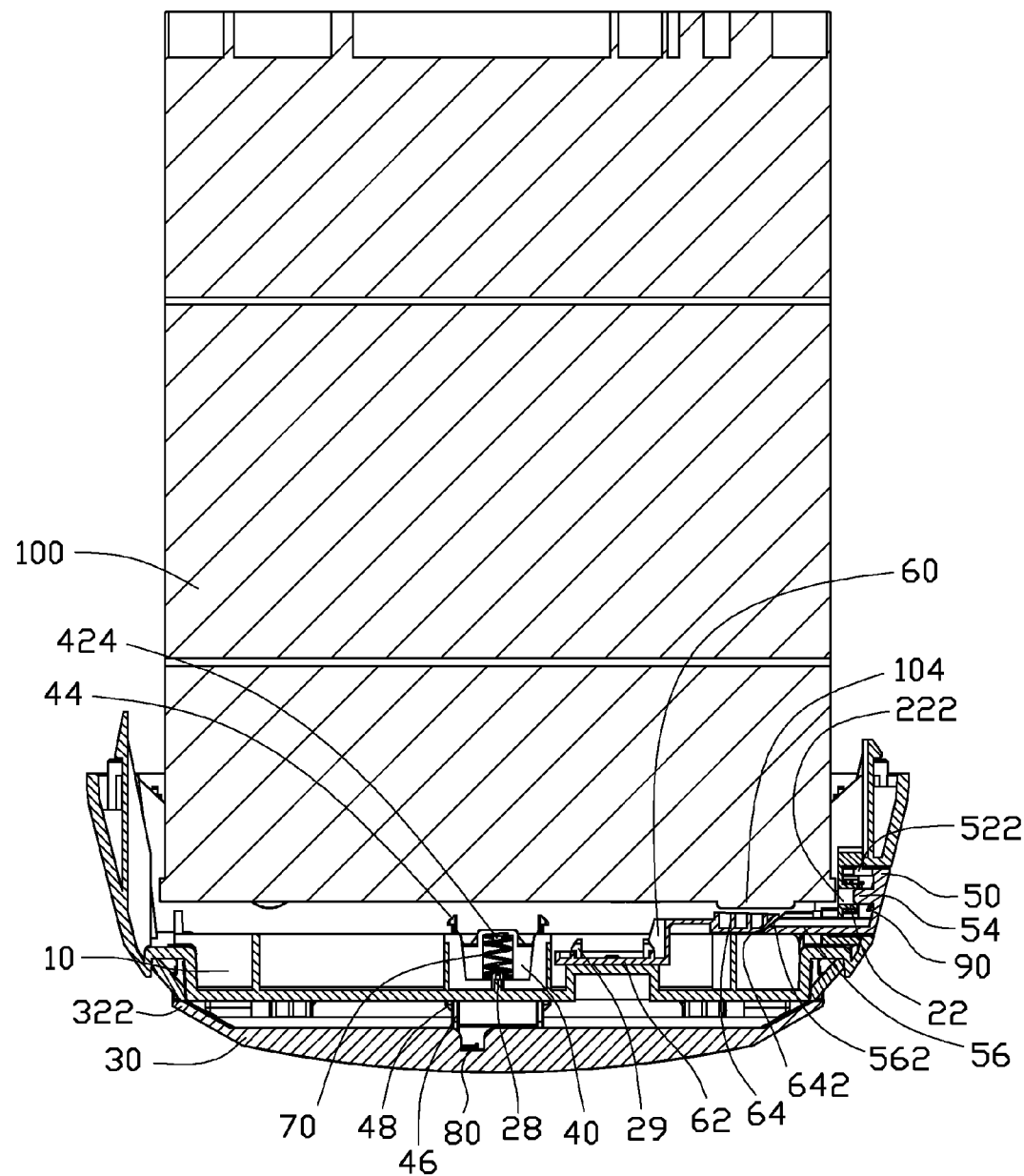
FIG. 5 is a cross section view of FIG. 4, taken along line V-V thereof.
Figure 6:
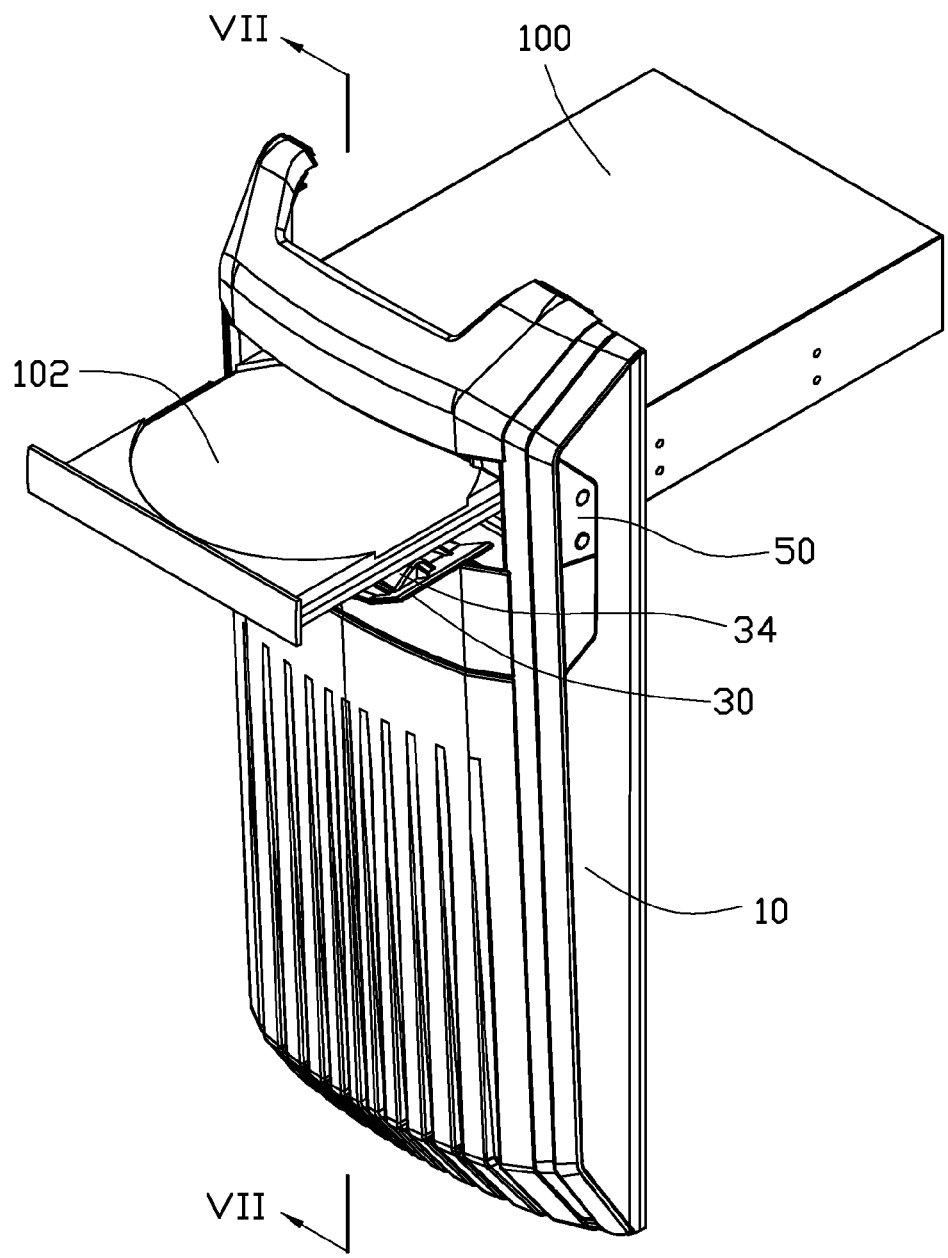
FIG. 6 is an isometric, assembled view of the panel and the optical drive of FIG. 1 when a tray of the optical drive is ejected.

Referring to FIG. 3, when assembled, the linking-up member 40 is pushed into the front panel 10 through the first passage 18, and the retaining arm 44 protrudes to the rear side of the base plate 12. The first resilient member 70 is received in the trough 422 of the linking-up plate 42, and one end of the first resilient member 70 is set in the retaining pin 424 while the other end abuts to the rear side of the base plate 12 and restricted between two bumps 28 (shown in FIG. 7). The first resilient member 70 forces the linking-up member 40 to move backwards until the retaining protrusions 48 are blocked by the front side of the base plate 12. In the present embodiment, the first resilient member 70 is a coil spring. The pivot pin 462 of the suspension arm 46 is engaged to the pivot hole 362 of the pivot section 36. The second resilient member 80 is set to the spring holder 464 of the suspension arm 46. In the present embodiment, the second resilient member 80 is a torsion spring, and the two ends of the second resilient member 80 are abutting against the spring hook 38 and the linking-up plate 42 to pull the door 30 to close the opening 16 of the front panel 10. The two side pieces 322 abut to the front panel 10.

The pushing arm 56 of the button 50 penetrates the second passage 24 of the recess 20 of the first side plate 14. One end of the third resilient members 90 is set to the column 22 of the recess 20, and the other end is set to the pillar 54 of the button 50. The pillar 54 is mounted to the column hole 222 of the column 22, and the securing member 522 of the button 50 is engaged to the securing trough 26 of the recess 20. In the present embodiment, the third resilient member 90 is a coil spring, the button 50 pushed to press the pushing arm 56 through the second passage 24 and the third resilient member 90 can push the button 50 to its initial position after the button 50 is released.

The securing hook 29 in the rear side of the base plate 12 engages to the securing slot 622 of the fixation section 62 of the pushing member 60 to fix the pushing member 60 to the base plate 12. The actuating surface 642 of the actuating section 64 abuts the pushing surface 562 of the pushing arm 56.

Referring to FIG. 4-7, the optical drive 100 is installed in the rear side of the base plate 12, and the tray 102 and the eject button 104 are aligned with the opening 16 of the base plate 12 and the actuating section 64 of the pushing member 60. The pushing surface 562 pushes the actuating surface 642 when the button 50 is pressed, forcing the linking section 66 of the pushing member 60 to deform elastically. The actuating section 64 presses the eject button 104 to eject the tray 102, the ejected tray 102 abuts the two bow-shaped members 34 of the door 30 and pushes the door 30 outward. The linking-up plate 42 can slide outward in the first passage 18 when the lower part of cover plate 32 abuts to the edge of the front panel 10 to apply smooth rotation of the door 30. When the door 30 is pushed to horizontal position, the resilient member forces the linking-up plate 42 to slide to its initial position. The linking section 66 restores and releases the eject button 104 when the button 50 is released, and the tray 102 remains ejected.

The button 50 is pressed again to press the eject button 104, and the tray 102 moves back to the optical drive 100. The second resilient member 80 pushes the door 30 toward the front panel 10 to cover the opening 16, and the third resilient members 90 restore and push the button 50 to its initial position when the button 50 is released.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A panel, comprising:
a front panel defining an opening thereon to access an optical drive;
a door for covering and uncovering the opening; and
a linking-up member slidably received in a first passage of the front panel and pivotally engaged with the door; a first resilient member restricted between a rear side of the front plate and the linking-up member, wherein the first resilient member pulls the linking-up member inward; a second resilient member being positioned between the door and the linking-up member to pull the door inward to cover the opening, and wherein the door is pushed outward to uncover the opening when a tray of the optical drive is ejected.

2. The panel as claimed in claim 1, wherein the linking-up member comprises a suspension arm; and the door comprises a pivot section to pivotally engage to a pivot pin on the suspension arm.

3. The panel as claimed in claim 2, wherein the second resilient member is set to a holder arranged on the suspension arm, and two ends of the second resilient member abut the linking-up member and a hook arranged on the door, respectively.

4. The panel as claimed in claim 1, wherein a trough is defined on the linking-up member to receive the first resilient member; one end of the first resilient member is set to a retaining pin arranged in the trough and the other end of the first resilient member abuts to the rear side of the front plate.

5. The panel as claimed in claim 1, wherein a retaining protrusion is arranged on a side of the linking-up member to abut the front side of the front panel.

6. The panel as claimed in claim 1, wherein a button penetrating through the front panel; and the button comprises a pushing arm to push a pushing member fixed on the rear side to trigger an eject button of the optical drive.

7. The panel as claimed in claim 6, wherein the pushing member comprises a fixation section, an actuating section, and a linking section; the fixation section is fixed to a rear side of the base plate, and the linking section is connected between the fixation section and the actuating section; and the pushing arm penetrates through the front plate and abuts to the actuating section to force the actuating section to trigger the eject button when the button is pressed.

8. The panel as claimed in claim 7, wherein a securing slot defined on the fixation section is to engage with a securing hook arranged on the rear side of the front panel.

9. The panel as claimed in claim 7, wherein the linking section is made of flexible material.

10. The panel as claimed in claim 7, wherein an actuating surface is defined on the actuating section; and a pushing surface defined on the pushing arm pushes the actuating surface to force the actuating section to trigger the eject button.

11. The panel as claimed in claim 6, wherein the button is received in a recess of a side plate extended from the front panel; a third resilient member is set between the button and the recess, and a securing member arranged on the button is engaged with a securing trough defined in the recess.

12. The panel as claimed in claim 11, wherein a column is arranged in the recess, and a pillar is arranged on the button to fix to a column hole of the column, and wherein the third resilient member is penetrated by the column and the pillar.

* * * * *